United States Patent Office 2,857,249
Patented Oct. 21, 1958

2,857,249
METHOD OF PURIFYING SILICON TETRACHLORIDE

Guenter A. Wolff, Little Silver, N. J., assignor to the United States of America as represented by the Secretary of the Army No Drawing. Application July 3, 1956
Serial No. 595,802

2 Claims. (Cl. 23—205)

(Granted under Title 35, U. S. Code (1952), sec. 266)

The invention described herein may be manufactured and used by or for the Government for governmental purposes without the payment of any royalty thereon.

This invention relates to methods of purification of silicon compounds and more particularly to methods of separating boron compounds from silicon compounds.

The conventional methods of purification of silicon compounds have proved to be successful for all impurities but boron. The reason for this failure is that according to the diagonal relationship of the periodic table both elements boron (B) and silicon (Si) or corresponding compounds such as their halides, e. g. chlorides ($BCl_3$, $SiCl_4$) bromides or fluorides differ only little in properties.

I have found that the difference in structure of the outer electron shell of silicon and boron may be utilized for the separation of these two elements.

The method of the present invention consists broadly in adding a nucleophilic amine or cyanide of the general formula $NR_3$ or $RCN$ where R is for instance, a methyl, ethyl or phenyl group, to the silicon halide such as $SiCl_4$ which is to be purified from its contaminating boron compound such as boron trichloride ($BCl_3$) or any other halide. After formation of the molecular compound $Cl_3BNR_3$ of low solubility or low vapor pressure with respect to $BCl_3$, the resulting mixture can be separated by any conventional fractional distillation method into a volatile boron-free fraction and a boron-contaminated residue. A modification of this process is given when instead of the nucleophilic compound $NR_3$ a resin is used having attached nucleophilic tertiary —$NR_2$ groups or quaternary —$NR_3Cl$ groups with exchange character (substituents R may be different in compounds or groups). In this case it is only necessary to pass the contaminated silicon compound through a column of the described nucleophilic or exchange resin.

The invention will be illustrated with the help of the following examples:

Example 1

One thousand gm. of liquid silicon tetrachloride ($SiCl_4$) containing for instance, 1 gm. of boron trichloride ($BCl_3$) are introduced into a three-neck glass flask equipped with a reflux condenser. About 10 gm. of triethylamine are then added to the liquid $SiCl_4$ and the liquid is then heated to the boiling point. The first fraction containing lower boiling impurities such as $CCl_4$ is removed until the temperature remains constant at 57.57° C. at which temperature pure $SiCl_4$ vaporizes and distils over.

After about half an hour (depending on the speed of distillation) the temperature starts to rise again indicating that other higher boiling impurities such as silicon tetrabromide, or the like start to go over and the distillation will of course be interrupted before that time so as to obtain a middle fraction containing pure $SiCl_4$ only. The residue contains high boiling compounds such as zinc chloride.

Instead of using triethylamine other amines such as trimethyl or triphenyl amines may be introduced into the liquid silicon halide. Good results have also been obtained by using instead of amines such cyanides as methly, ethyl or phenyl cyandies.

Example 2

A glass column of two meter lengths and three centimeters in diameter is filled with a synthetic resin which has attached to its polymer chain certain dialkylamine groups of nucleophilic character as for instance $N(CH_3)_2$ groups. Such resins are well known and usually consist of vinyl type resins containing attached some of the aforementioned dialkylamine groups. I have found that such resins may be used with great advantage for the absorption of traces of $BCl_3$ from its solution in silicon tetrachloride. For this purpose the liquid silicon tetrachloride that is to be purified is passed through the column at a slow rate. It is advantageous to use a battery of columns so as to attain complete purification. Instead of passing the substance to be purified in liquid form, it is also possible to pass it in gaseous form through the battery of columns. The spent nucleophilic resin may of course be reactivated in the conventional manner.

The method of the present invention may be used to remove all impurities from silicon halides that are volatile as halides; such impurities are for instance aluminum, indium, gallium and also zinc and cadmium.

The purified silicon halide may be transformed by the usual methods into silicon of transistor grade purity.

The processes outlined can be used for the purification of any other contaminated silicon halide or corresponding silicon compound. The processes can be modified by increasing the reactivity of the nucleophilic reagent by introducing strongly inducing substituents R such as —$SO_2(CH_3)_2$ or by applying the chemical reactive hydrogen as a substituent. The processes are especially of value for the elimination of boron traces for the preparation of silicon of transistor-grade purity, but they can also be applied for the separation of small amounts of silicon from boron.

What is claimed is:

1. A method of purifying silicon tetrachloride of traces of boron trichloride comprising adding a nucleophilic amine of the structural formula $NR_3$ where R is an alkyl radical to the silicon tetrachloride contaminated by said boron trichloride so as to form an addition-complex compound of boron of low vapor pressure and separating the liquid by a fractional distillation under reflux conditions into a boron-free silicon tetrachloride fraction and a boron-contaminated residue.

2. Method of purifying silicon tetrachloride of traces of boron trichloride according to claim 1 in which triethylamine is added to the silicon tetrachloride containing traces of boron trichloride.

References Cited in the file of this patent

UNITED STATES PATENTS

| | | |
|---|---|---|
| 2,167,358 | Gleason | July 25, 1939 |
| 2,400,874 | Burk | May 28, 1946 |
| 2,400,875 | Hughes | May 28, 1946 |

OTHER REFERENCES

Chem. Abs. 37, 5670 (1943).